(12) United States Patent
Regier et al.

(10) Patent No.: US 12,111,235 B1
(45) Date of Patent: Oct. 8, 2024

(54) CANTILEVERED TEST FIXTURE FOR VIBRATION TESTING

(71) Applicant: Honeywell Federal Manufacturing & Technologies, LLC, Kansas City, MO (US)

(72) Inventors: Bernard K. Regier, Livermore, CA (US); Alex Cruz, Raymore, MO (US); Benjamin Sorensen, Olathe, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/399,635

(22) Filed: Dec. 28, 2023

(51) Int. Cl.
*G01M 7/02* (2006.01)

(52) U.S. Cl.
CPC .................... *G01M 7/027* (2013.01)

(58) Field of Classification Search
CPC .......... G01M 7/027; G01M 7/00; G01M 7/02; G01M 7/04; G01M 7/08
See application file for complete search history.

(56) References Cited

U.S. PATENT DOCUMENTS

| | | | | |
|---|---|---|---|---|
| 2,925,503 | A | * | 2/1960 | Efromson ............... H02K 33/18 310/27 |
| 4,069,706 | A | * | 1/1978 | Marshall ................. G01M 7/04 73/666 |
| 6,713,938 | B2 | | 3/2004 | Nguyen |
| 8,154,176 | B2 | | 4/2012 | Karakaya et al. |
| 10,724,897 | B2 | | 7/2020 | Xu et al. |
| 2018/0156689 | A1 | * | 6/2018 | McGranahan ........ G01M 7/027 |

\* cited by examiner

*Primary Examiner* — Suman K Nath
(74) *Attorney, Agent, or Firm* — Erise IP, P.A.

(57) ABSTRACT

A test fixture for vibration testing is disclosed. The test fixture may include an edge with a mounting slot for receiving a fastener to couple the test fixture to a supporting structure. A separating slot may extend through the test fixture proximal to the mounting slot. When the test fixture is coupled to the supporting structure via the mounting slot, the remainder of the test fixture may be unsupported, thereby cantilevering the test fixture. Cantilevering the test fixture, along with the flexibility provided by the separating slot, may enable the natural frequency of the test fixture to be controlled, allowing for additional vibrational frequencies to be measured and improving the signal-to-noise ratio. The length of the separating slot may be adjustable to adjust the frequency response of the test fixture. A coupling mass may also be attached to the test fixture to adjust the frequency response.

20 Claims, 7 Drawing Sheets

CANTILEVERED TEST FIXTURE FOR VIBRATION TESTING

STATEMENT OF GOVERNMENT SUPPORT

This invention was made with government support under Contract No.: DE-NA-0002839 awarded by the United States Department of Energy/National Nuclear Security Administration. The government has certain rights in the invention.

BACKGROUND

1. Field

Embodiments of the present disclosure relate to systems and methods for control of harmonic damping in structures. More specifically, embodiments of the present disclosure relate to a cantilevered test fixture for control of harmonic damping and the frequency response of the test fixture for vibration testing and other applications.

2. Related Art

Vibration testing is performed to characterize structures and to ensure that the natural frequencies of the structure are outside the range of the expected frequencies experienced by the structure in operation to avoid resonance. During vibration testing, a bandwidth of interest may be identified that comprises a range of frequencies expected to be measured when an excitation is applied. However, due to the design of common test fixturing for vibration testing, vibrations at frequencies within the band of interest may be attenuated/damped by the test fixturing or a support to which the test fixturing is attached, which may lead to erroneous measurement results and a poor signal-to-noise ratio. What is needed is improved test fixturing for vibration testing.

SUMMARY

Embodiments of the present disclosure solve the above-mentioned problems by providing a cantilevered test fixture that enables the harmonic damping of the cantilevered test fixture to be controlled, which may be useful in applications such as vibration testing. The cantilevered test fixture may include a fixed end with a mounting slot for receiving at least one fastener to couple the fixed end to a supporting structure. An unsupported test region may extend from the fixed end, providing a surface to which a unit under test (UUT) may be attached for vibration testing. The cantilevered test fixture may include a separating slot proximal to the fixed end that at least partially separates the fixed end from the unsupported test region. A length of the separating slot may be selected based on a desired first mode natural frequency of the cantilevered test fixture, with increasing slot lengths lowering the first mode natural frequency of the test fixture due to the increased flexibility provided by the absence of material. The first mode natural frequency may correspond to a cutoff frequency of the cantilevered test fixture such that frequencies below the cutoff frequency are damped by the cantilevered test fixture. The length of the separating slot may also be adjustable on the cantilevered test fixture. A coupling mass may be coupled to the test fixture to increase the mass of the cantilevered test fixture and adjust the frequency response. The cantilevered test fixture may also include an accelerometer mount with one or more mounting points to which accelerometers may be mounted for measuring vibrations and ensuring correct performance (e.g., frequency response) of the cantilevered test fixture.

In some embodiments, the techniques described herein relate to a test fixture for vibration testing, including: a fixed end and an unsupported test region configured to receive a unit under test; a separating slot separating the fixed end from the unsupported test region, wherein a first mode natural frequency of the test fixture is based on a length of the separating slot; a mounting slot proximal to the separating slot and extending through the fixed end; wherein the mounting slot is configured to receive at least one fastener to couple the fixed end to a supporting structure, thereby cantilevering the test fixture.

In some embodiments, the techniques described herein relate to a test fixture, wherein the fixed end adjoins a second end, and wherein the separating slot extends along the fixed end and along the second end.

In some embodiments, the techniques described herein relate to a test fixture, further including at least one peg protruding from a top surface of the unsupported test region and wherein the at least one peg is configured to couple to a mass to adjust a frequency response of the test fixture.

In some embodiments, the techniques described herein relate to a test fixture, wherein the length of the separating slot is adjustable to adjust the first mode natural frequency of the test fixture.

In some embodiments, the techniques described herein relate to a test fixture, wherein the test fixture is attachable to the supporting structure in a plurality of orientations.

In some embodiments, the techniques described herein relate to a test fixture, further including: an accelerometer mount for receiving at least one accelerometer, the accelerometer mount protruding from a bottom surface of the unsupported test region.

In some embodiments, the techniques described herein relate to a test fixture, wherein the test fixture includes at least one of aluminum or magnesium.

In some embodiments, the techniques described herein relate to a test fixture, including: a slotted edge having an opening therethrough for receiving at least one fastener to fixedly attach the slotted edge to a supporting structure; a test region; and a slot proximal to the slotted edge and separating the slotted edge from the test region such that the test fixture is cantilevered when the slotted edge is coupled to the supporting structure.

In some embodiments, the techniques described herein relate to a test fixture, wherein a first mode natural frequency of the test fixture is adjustable based on a length of the slot.

In some embodiments, the techniques described herein relate to a test fixture, wherein the first mode natural frequency of the test fixture corresponds to a cutoff frequency of the test fixture.

In some embodiments, the techniques described herein relate to a test fixture, further including: at least one mounting point configured to receive a coupling mass to increase a mass of the test fixture.

In some embodiments, the techniques described herein relate to a test fixture, wherein the test fixture includes one of aluminum or magnesium.

In some embodiments, the techniques described herein relate to a test fixture, where the slot extends along the slotted edge.

In some embodiments, the techniques described herein relate to a system for vibration testing, including: a supporting structure; and a test fixture, including: a fixed end having an opening therethrough; an unsupported test region; and a slot separating the fixed end from the unsupported test region; at least one fastener inserted in the opening for fixedly attaching the fixed end to the supporting structure, thereby cantilevering the test fixture.

In some embodiments, the techniques described herein relate to a system, wherein the supporting structure is configured to transfer an excitation to the test fixture.

In some embodiments, the techniques described herein relate to a system, wherein the test fixture further includes: an accelerometer mount having at least one mounting point for mounting an accelerometer.

In some embodiments, the techniques described herein relate to a system, wherein a length of the slot is adjustable.

In some embodiments, the techniques described herein relate to a system, further including a coupling mass configured to be coupled to the test fixture to increase a mass of the test fixture, thereby adjusting a cutoff frequency of the test fixture.

In some embodiments, the techniques described herein relate to a system, wherein the unsupported test region of the test fixture includes at least one peg configured to receive the coupling mass.

In some embodiments, the techniques described herein relate to a system, wherein the test fixture is mountable to the supporting structure in a plurality of orientations.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1A:
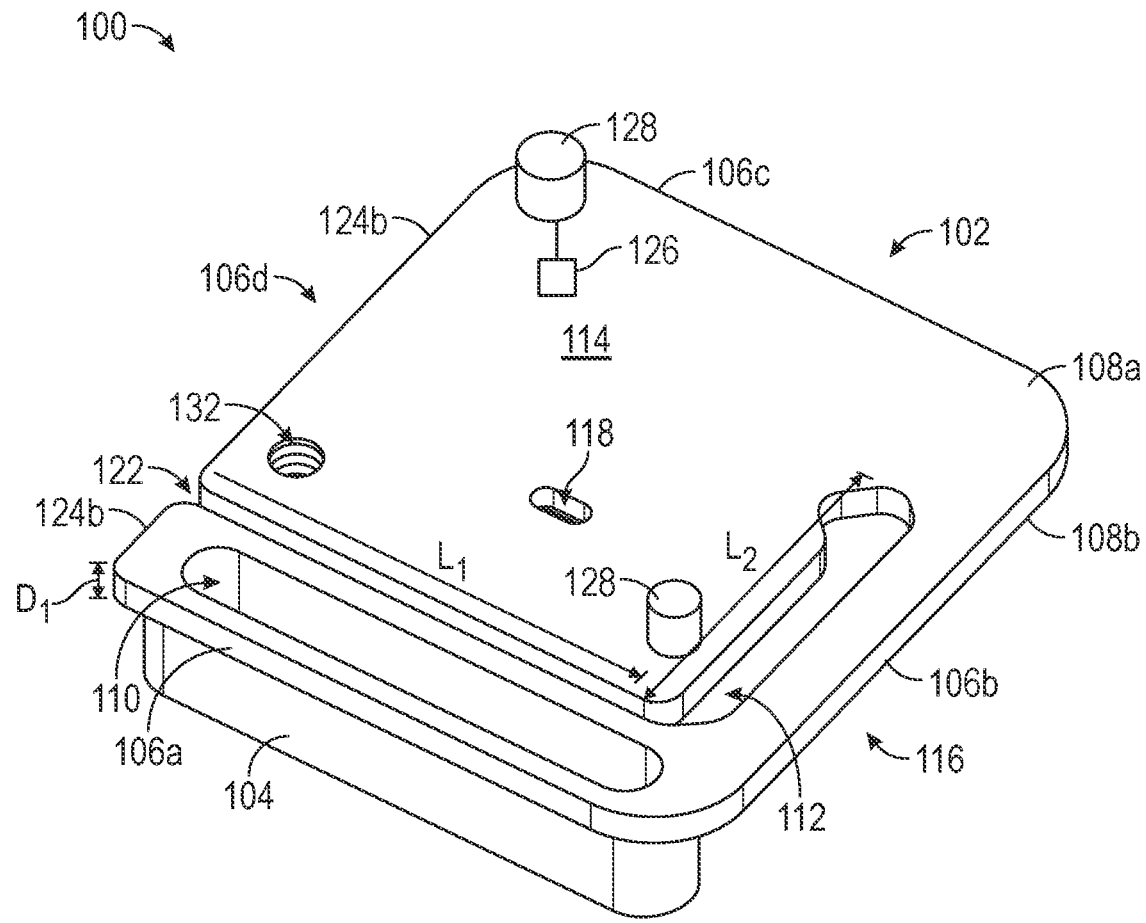
FIG. 1A illustrates a top perspective view of a cantilevered test fixture for some embodiments.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments of the present disclosure are generally directed to a cantilevered test fixture to control harmonic damping and the frequency response of the cantilevered test fixture for vibration testing, among other applications. The cantilevered test fixture may include a fixed end and an unsupported test region. A separating slot may at least partially separate the fixed end from the unsupported test region and may define a moment arm that extends between the fixed end and the test region. The length of the separating slot may be selected and/or adjusted to control the frequency response of the cantilevered test fixture. For example, the length of the separating slot may be selected to obtain a desired first mode natural frequency, which may correspond to a cutoff frequency for the test fixture such that frequencies above the cutoff frequency can be measured. Thus, an improved signal-to-noise ratio may be obtained because signals that were previously attenuated by the test fixture may no longer be attenuated. The mass of the cantilevered test fixture can likewise be varied to control the frequency response. The cantilevered test fixture may be mountable to a supporting structure in any orientation via a mounting slot in the fixed end to obtain single-axis linear and angular displacements at a desired orientation.

Figure 1B:
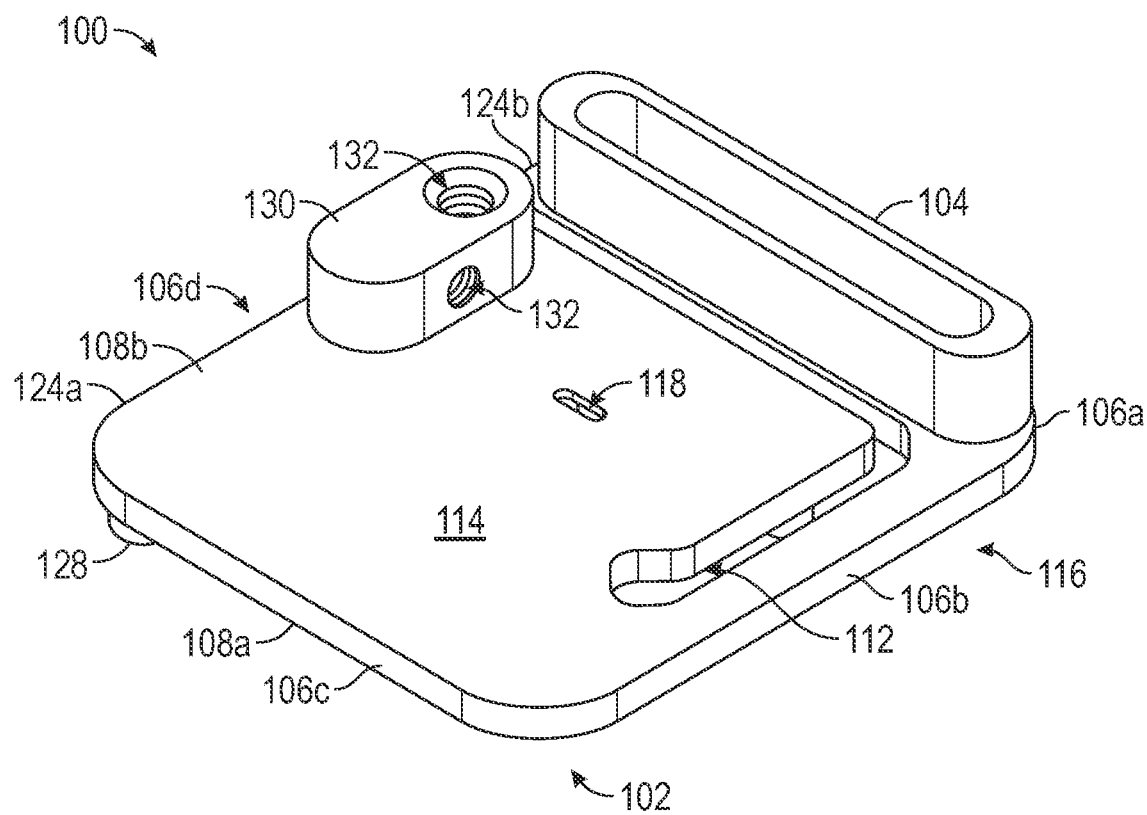
FIG. 1B illustrates a bottom perspective view of the cantilevered test fixture for some embodiments.
Figure 1C:
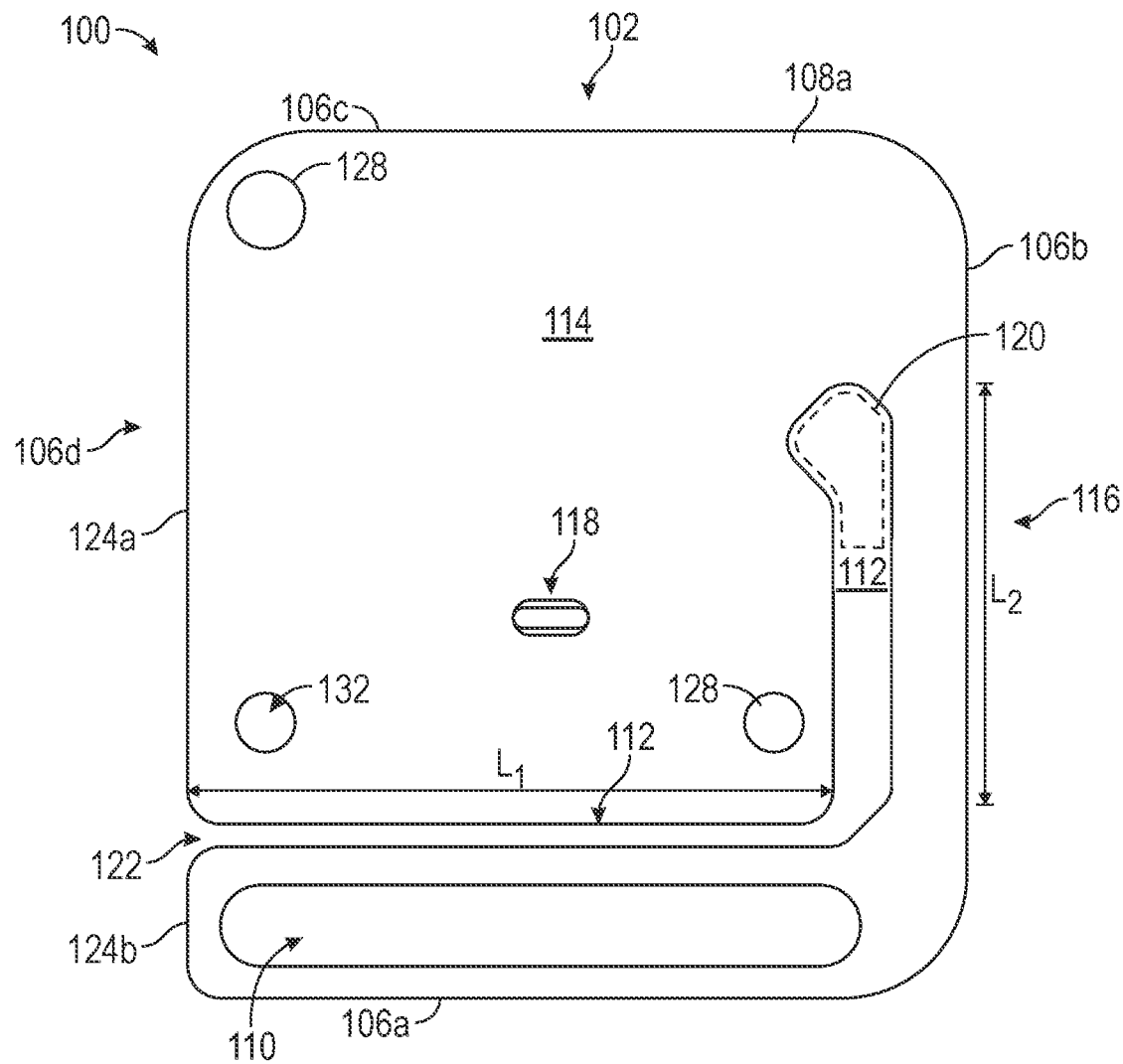
FIG. 1C illustrates a top planar view of the cantilevered test fixture for some embodiments.

FIGS. 1A, 1B, and 1C illustrate a top perspective view, a bottom perspective view, and a top planar view, respectively, of a cantilevered test fixture 100 in accordance with embodiments of the present disclosure. Test fixture 100 may include a test plate 102 and a receptacle 104. In some embodiments, test plate 102 has a generally square shape and may include a first side 106a, a second side 106b, a third side 106c, and a fourth side 106d. First side 106a may oppose third side 106c, and second side 106b may oppose fourth side 106d. First side 106a may adjoin sides 106b, 106d; second side 106b may additionally adjoin third side 106c; and third side 106c may additionally adjoin fourth side 106d. Test plate 102 may take various other shapes (e.g., rectangular, triangular, trapezoidal, etc.) without departing from the scope hereof. Test plate 102 may additionally include a top surface 108a and a bottom surface 108b. Receptacle 104 may extend from bottom surface 108b at first side 106a. In some embodiments, receptacle 104 is formed integrally with test plate 102 such that test fixture 100 presents a unitary structure. In some embodiments, receptacle 104 and test plate 102 are discrete components, and receptacle 104 may be coupled to test plate 102. Receptacle 104 may be coupled to test plate 102 using fasteners such as screws or bolts, via a welded connection, via adhesives, or the like. First side 106a may be formed with a mounting slot 110 that connects to an opening formed in receptacle 104. Receptacle 104 and mounting slot 110 may be configured to receive a fastener therein to fixedly attach test fixture 100 to a supporting structure (see FIG. 3).

As shown, a separating slot 112 may be disposed proximal to first side 106a. The separating slot 112 may extend along first side 106a and along second side 106b. In some embodiments, the separating slot 112 additionally extends along third side 106c and/or fourth side 106d. The separating slot 112 may at least partially separate the fixed, first side 106a from an unsupported unit under test (UUT) region 114 of test plate 102 on which a UUT is configured to be disposed for vibration testing. In some embodiments, separating slot 112 extends along second side 106b so as to define a moment arm 116. In some embodiments, the moment arm 116 has a length equivalent to a length of the slot 112 along second side 106b (i.e., L2 as discussed further below).

As shown, UUT region 114 may comprise an opening 118 via which the UUT may be coupled to UUT region 114. In some embodiments, the location of opening 118 may correspond to the center of mass of test fixture 100 or test plate 102. Thus, the UUT may be coupled to test plate 102 such that the center of mass of the UUT and the center of mass of the test plate 102 are aligned (e.g., are coaxial).

The removal of material provided by including separating slot 112 allows for the flexibility of test fixture 100 to be increased as compared to a solid test fixture such that the natural frequency of test fixture 100 is reduced relative to a similar, solid test fixture (e.g., same material(s), dimensions, etc.). In some embodiments, the first mode natural frequency of test fixture 100 corresponds to a cutoff frequency of the test fixture 100 such that vibrations at frequencies below the cutoff frequency are attenuated through the test fixture 100. In some embodiments, the first mode natural frequency corresponding to the cutoff frequency means that the first mode natural frequency is equivalent to the cutoff frequency or is near the cutoff frequency (e.g., within a +/−5% difference). The test fixture 100 may, therefore, function as a high-pass filter in which the first mode natural frequency corresponds to the cutoff frequency, while vibrational frequencies above the cutoff frequency pass through the test fixture 100 such that these vibrational frequencies are measurable. Accordingly, by providing a cantilevered test fixture 100 with a reduced first mode natural frequency, the range of frequencies that can be measured is increased. Thus, the signal-to-noise ratio of the test fixture 100 may be improved relative to a non-cantilevered test fixture as previously discussed.

Test fixtures 100 may be provided with separating slot 112 in differing lengths (e.g., having moment arms of different lengths) such that different test fixtures 100 have different natural frequencies and an appropriate test fixture can be selected based on the desired first mode natural frequency of the test fixture. The frequency response may be lowered as the dimensions of separating slot 112 increase (e.g., length and/or width) such that larger slots 112 may provide lower first mode natural frequencies. To state another way, increasing the flexibility of the test fixture 100 can lower the cutoff frequency of the test fixture. In some embodiments, and as discussed further below with respect to FIG. 3, test fixture 100 is provided with an adjustable separating slot 112 to provide a single test fixture with adjustable natural frequencies.

Various methods of adjusting the length of separating slot 112 are within the scope hereof. In some embodiments, test plate 102 is formed with a separating slot 112 having a maximum length and/or width, and material can be added into the separating slot 112 to adjust the length of the separating slot 112. For example, it is contemplated that the sidewalls formed by slot 112 could include grooves, and a grooved piece of material could be press fit or slid into the grooved sidewalls to decrease the length of separating slot 212. As another example, a cutout 120 (FIG. 1C) could be press fit into separating slot 112 as illustrated by the dashed lines.

In some embodiments, the length of separating slot 112 is defined by a first length L1 measured from fourth side 106d to an end of the separating slot 112 along first side 106a and a second length L2 measured along second side 106b as illustrated. The second length L2 may correspond to a length of arm 116. As discussed, separating slot 112 may only extend along first side 106a such that the length of the separating slot 112 is L1 (i.e., L2 is 0, see FIG. 2). In some embodiments, the length of the separating slot 112 is defined solely by L2, which may be the length of the moment arm 116 as discussed above. The separating slot 112 may be formed such that a gap 122 separates fourth side 106d into two discrete sections 124a, 124b. In some embodiments, separating slot 112 does not separate fourth side 106d such that the perimeter of test plate 102 is continuous. In some embodiments, separating slot 112 has length of about 0.02 inches to about 3 inches. In some embodiments, the separating slot 112 has a length of 2 inches. Generally, a separating slot 112 of any dimension may be used. In some embodiments, a width of separating slot 112 is larger along second side 106b than along first side 106a. In some embodiments, the width of separating slot 112 is larger along first side 106a than along second side 106b. In some embodiments, the width of separating slot 112 is the same along first side 106a and second side 106b. Increasing the width of separating slot 112 may likewise decrease the first mode natural frequency of the test fixture 100, thereby lowering the cutoff frequency. It is contemplated that separating slot 112 may not be present in some embodiments, e.g., if a higher cutoff frequency is desired.

A distance D1 between top surface 108a and bottom surface 108b may define a thickness or height of test plate 102. The distance D1 may similarly be adjusted to control the frequency response. The modal frequencies of a cantilevered beam (analogous to test fixture 100) are given by the following equation:

$$f_n = \frac{\beta_n^2}{2\pi}\sqrt{\frac{EI}{\mu}}$$

where $\beta_n$ is a coefficient that can be determined from the boundary conditions for the cantilevered beam; E is the elastic modulus; I is the second moment of cross-sectional area; and μ is the linear density. Thus, it can be seen how, by increasing the thickness D1 of test plate 102, thereby increasing I, results in larger resonant frequencies (i.e., larger first mode natural frequencies). As such, test plates 102 of different thicknesses D1 may be provided to provide test fixtures 100 with different natural frequencies. In some embodiments, the thickness D1 of test plate 102 is about 0.05 inches to about 0.25 inches. In some embodiments, the thickness D1 of test plate 102 is about 0.13 inches. It will be appreciated that the dimensions of test plate 102 may be scaled up and/or down based on, for example, the size of the UUT to be tested.

It is contemplated that a secondary test plate could be attached to the test plate 102 to increase the thickness D1. For example, a secondary test plate with a geometry corresponding to that of test plate 102 could be attached to the test plate 102, e.g., via screws or other like fastening mechanisms. The secondary test plate may be formed with through holes in locations corresponding to pegs 128 (discussed below) on test plate 102 such that the pegs 128 protrude from the secondary test plate and may otherwise be formed to have a geometry that does not interfere with the functioning of test plate 102. The secondary test plate could be formed from the same material or of a different material than test plate 102.

More generally, the mass of the test fixture 100 may be varied to adjust the frequency response, with the first mode natural frequency (and other frequency modes) decreasing with increasing mass when the length of the moment arm is held constant. For example, a coupling mass 126 may be attached to the test plate 102 to increase the mass of test fixture 100 to decrease the first mode natural frequency of test fixture 100. In some embodiments, test plate 102 additionally comprises one or more pegs 128 that provide mounting points for attaching the coupling mass to test fixture 100. Thus, pegs 128 provides for a single test fixture 100 to have configurable cutoff frequencies such that the single test fixture 100 can be used as a fixture for vibration testing distinct UUTs. For example, it may be desirable to test a first UUT at a first cutoff frequency corresponding to the cutoff frequency of test fixture 100 when no additional mass is attached and to vibration test a second UUT at a second cutoff frequency, which can be achieved by attaching a mass to one or more pegs 128 without requiring the use of a separate test plate.

Figure 2:
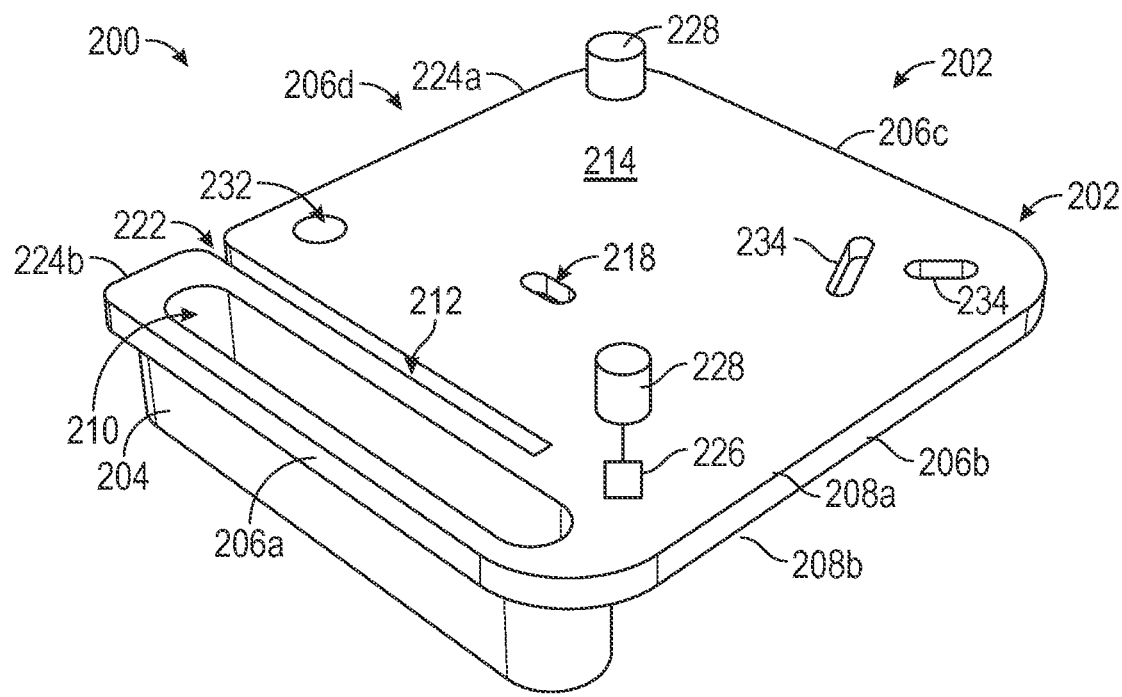
FIG. 2 illustrates a second embodiment of the cantilevered test fixture for some embodiments.

In some embodiments, pegs 128 are formed integrally with test fixture 100. In some embodiments, pegs 128 are removably attachable to test fixture 100. In some embodiments, pegs 128 are not present. Pegs 128 may protrude from top surface 108a and/or bottom surface 108b. Pegs may protrude from a surface 108a, 108b and have a height of about 0.2 inches or any other height. In some embodiments, pegs 128 include a threaded hole for threadedly attaching a coupling mass 126 to the pegs 128. Generally, a coupling mass may be coupled to test fixture 100 in any way to increase the mass of test fixture 100, thereby enabling the cutoff frequency of the test fixture to be adjusted. For example, and as shown in FIG. 2, a test fixture may include slots through the test plate via which a coupling mass may be attached to the test fixture.

As seen best in FIG. 1B, test fixture 100 may additionally comprise an accelerometer mount 130 having one or more mounting points 132. In some embodiments, accelerometer mount 130 extends from bottom surface 108b and is proximal to fourth side 106d. However, accelerometer mount 130 may generally be located at any point along bottom surface 108b or top surface 108a or elsewhere on test fixture 100.

The mounting points 132 may be configured to receive accelerometers for measuring vibration in test fixture 100. In some embodiments, mounting points 132 are configured as threaded screw holes for threadedly attaching an accelerometer to the mounting points 132. Accelerometers may be coupled to test fixture 100 to measure and/or validate the test fixture 100, e.g., to ensure the frequency response is as expected. For example, when adding a coupling mass to test fixture 100, accelerometers may be used to experimentally determine the new cutoff frequency of the test fixture 100, which will change with the addition of the coupling mass. The accelerometers may be single axis accelerometers, triaxial accelerometers, or any other type of accelerometer. Generally, any sensor for measuring vibration and/or acoustic response is within the scope hereof.

As previously discussed, test plate 102 may be generally square shaped and, in some such embodiments, sides 106a, 106b, 106c, 106d may each comprise a length of about 2 inches to about 4 inches, or about 2.75 inches. In some embodiments, the distance from first side 106a to third side 106c is greater than the distance from second side 106b to fourth side 106d. In some embodiments, the distance from first side 106a to third side 106c is about 2.75 inches, and the distance from second side 106b to fourth side 106d is about 2.5 inches.

Turning now to FIG. 2, a second test fixture 200 is illustrated in accordance with embodiments of the present disclosure. Test fixture 200 may be substantially similar to test fixture 100 discussed above and may include a test plate 202, a receptacle 204, sides 206a, 206b, 206c, 206d, surfaces 208a, 208b mounting slot 210, separating slot 212, UUT region 214, opening 218, gap 222, sections 224a, 224b, a coupling mass 226 pegs 228, an accelerometer mount (not shown), and mounting points 232. While not illustrated in FIG. 2, cutouts 120 may likewise be coupled to second test fixture 200 to control the frequency response of the test fixture 200.

In contrast to test fixture 100, slot 212 on second test fixture 200 extends only along first side 206a, thus reducing the flexibility of second test fixture 200 relative to test fixture 100. Accordingly, when excited, test fixture 200 may have a higher first mode natural frequency than test fixture 100. As with test fixture 100 discussed above, the length of slot 210 may be adjusted along first side 206a to control the first mode natural frequency. In some embodiments, test fixture 200 additionally includes one or more coupling slots 234. Coupling slots 234 may be configured for coupling a UUT and/or a coupling mass (not shown in FIG. 2) to the test plate 202. The coupling slots 234 may be located in test plate 202, extending from top surface 208a through bottom surface 208b. In some embodiments, one or more coupling slots 234 are located in a corner proximal to where second side 206b adjoins third side 206c. One or more coupling slots 234 may generally be located anywhere on test plate 202. In some embodiments, test plate 202 includes two coupling slots 234; however, greater or fewer coupling slots 234 may be included without departing from the scope of the present disclosure. In some embodiments, coupling slots 234 are provided in place of pegs 228. In some embodiments, a test fixture may include both one or more coupling slots 234 and one or more pegs 228.

In some embodiments, the test fixture 100, 200 is formed from aluminum, such as 6061 aluminum alloy (e.g., 6061-0, 6061-T4, 6060-T6, etc.), or any other aluminum alloy. In some embodiments, test fixture 100 is formed from steel, magnesium, or alloys thereof. It is contemplated that polymers may also be used. Materials with higher densities may have decreased natural frequencies, while materials with lower densities may have increased natural frequencies. Thus, the material of the test fixture 100, 200 may be selected to provide a desired natural frequency, which may be further controlled by the length of separating slot 112, the addition of a coupling masses 126, the height of the fixture 100, among other variables.

Figure 3:
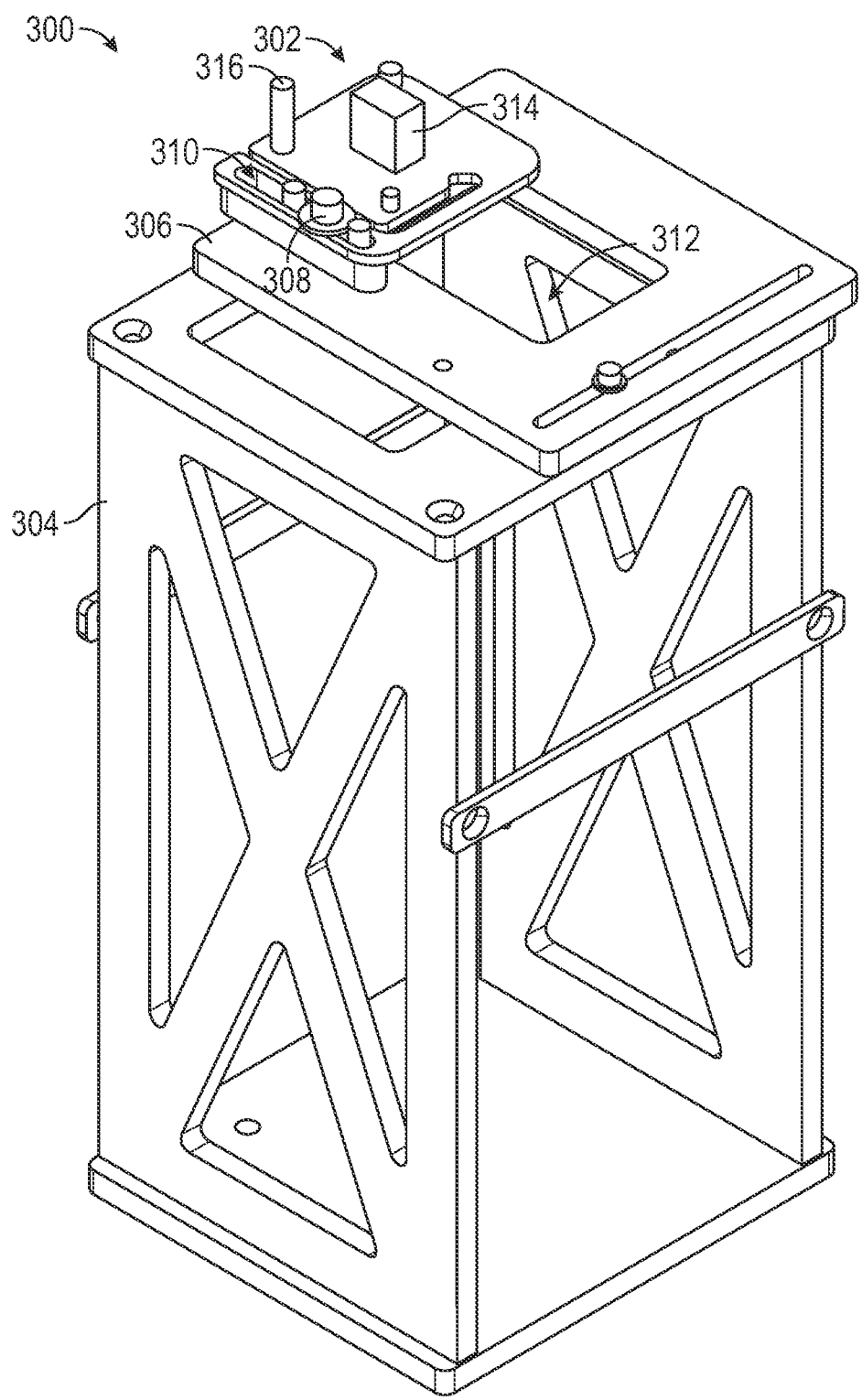
FIG. 3 illustrates a system for vibration testing for some embodiments.

Turning now to FIG. 3, an exemplary test system 300 is depicted in accordance with embodiments of the present disclosure. As shown, system 300 includes a test fixture 302, which may correspond to test fixtures 100, 200 and a supporting structure 304. In some embodiments, supporting structure 304 is a riser assembly, a shaker, or the like and configured to support test fixture 302. Generally, supporting structure 304 may provide a surface 306 to which an end of test fixture 302 can be coupled to form the cantilevered test fixture.

As shown, fasteners 308 are inserted through the slotted edge 310 of test fixture 302 to fixedly attach the test fixture 302 to the surface 306. The fasteners 308 may be inserted in any location along the length of slotted edge 310. Surface 306 may be formed with attachment points (e.g., screw holes) to receive fasteners 308. The surface 306 may be adjacent to an opening 312 in supporting structure 304 such that test fixture 302 is suspended over the opening 312 to allow for unimpeded bending of the test fixture 302 without abutting another surface. Thus, an excitation can be applied to test fixture 302 and/or the UUT(s) 314 coupled thereto to perform vibration analysis on the UUT 314. In some embodiments, supporting structure 304 is configured to transfer an excitation to the test fixture 302. In some embodiments, supporting structure 304 does not transfer an excitation to the test fixture 302, and the excitation may be applied directly to test fixture 302 and/or the UUT 314. The excitation may be a mechanical excitation (e.g., using a modal hammer), an electrical excitation, or any other excitation type. As previously discussed, an accelerometer 316 may be coupled to the test fixture 302 to obtain acceleration measurements, which can be used to measure vibrations as will be appreciated by one of skill in the art.

As previously discussed, test fixture 302 may be mounted in various orientations to test a UUT 314 when vibrations are applied along different axes. The slotted edge 310 may enable mounting of test fixture 302 in various orientations such that the response of the UUT can be tested in any orientation to obtain linear and angular displacements along a single axis. For example, test fixture 302 could be rotated 90 degrees relative to the illustrated position to test vibration along a different orthogonal axis.

Figure 4A:
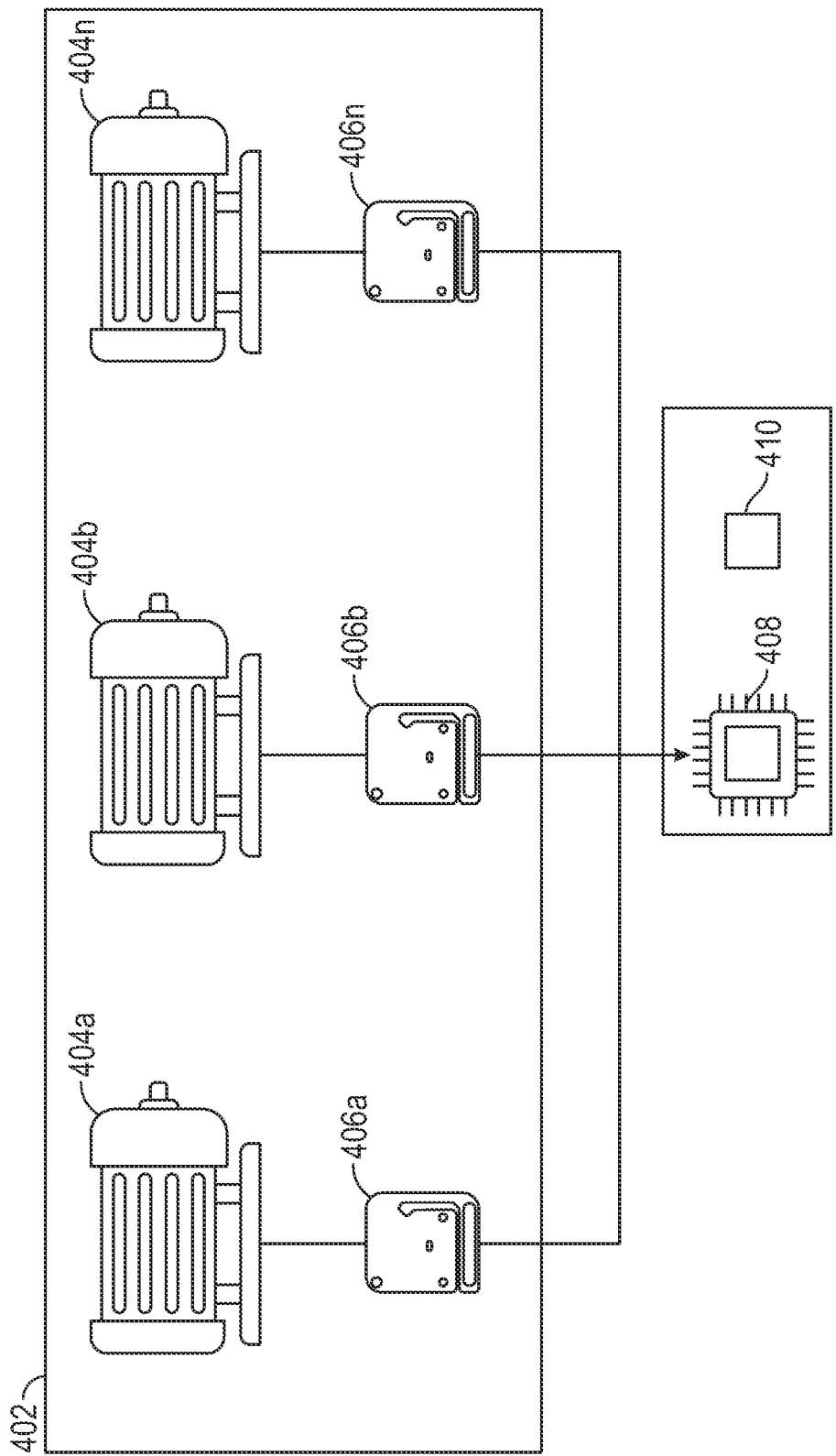
FIG. 4A illustrates a system for monitoring machine health for some embodiments.

Turning now to FIG. 4A, an exemplary application of the test fixture 100, 200 is illustrated in accordance with embodiments of the present disclosure. Outside of use in vibration testing, the test fixture 100, 200 may have various uses in vibration applications, which may be enabled by the use of the cantilevered test fixture to control the first mode natural frequency of the fixture 100, 200.

As one example, a device 402 may comprise a first motor 404a, a second motor 404b, and an $n^{th}$ motor 404n, which are respectively coupled to fixtures 406a, 406b, 406n. Motors 404a, 404b, 404n may be used to drive various components of the device 402. The motors 404a, 404b, 404n may be mounted to fixtures 406a, 406b, 406n or the motors 404a, 404b, 404n may otherwise be coupled to fixtures 406a, 406b, 406n such that the vibrations of the motors 404a, 404b, 404n can be transferred to fixtures 406a, 406b, 406n and detected by accelerometers thereon (not shown).

Thus, it is contemplated that the fixtures 406a, 406b, 406n may be used to monitor the health of device 402 by monitoring the performance of the motors 404a, 404b, 404n. While a single test fixture is shown as connected to a corresponding motor, it is contemplated that multiple motors may be connected to a single test fixture. As shown, device 402 may be coupled to one or more processors 408 such that vibration data obtained at fixtures 406a, 406b, 406n may be communicated to processors 408. The processors 408 be connected to a memory 410, storing one or more non-transitory computer-readable media that, when executed by the at least one of the processors 408, causes the processors 408 to carry out an action, such as an action associated with a corrective measurement, e.g., cause device 402 to shut down an aberrational motor 404a, 404b, 404n or otherwise adjust the operation of device 402.

Figure 4B:
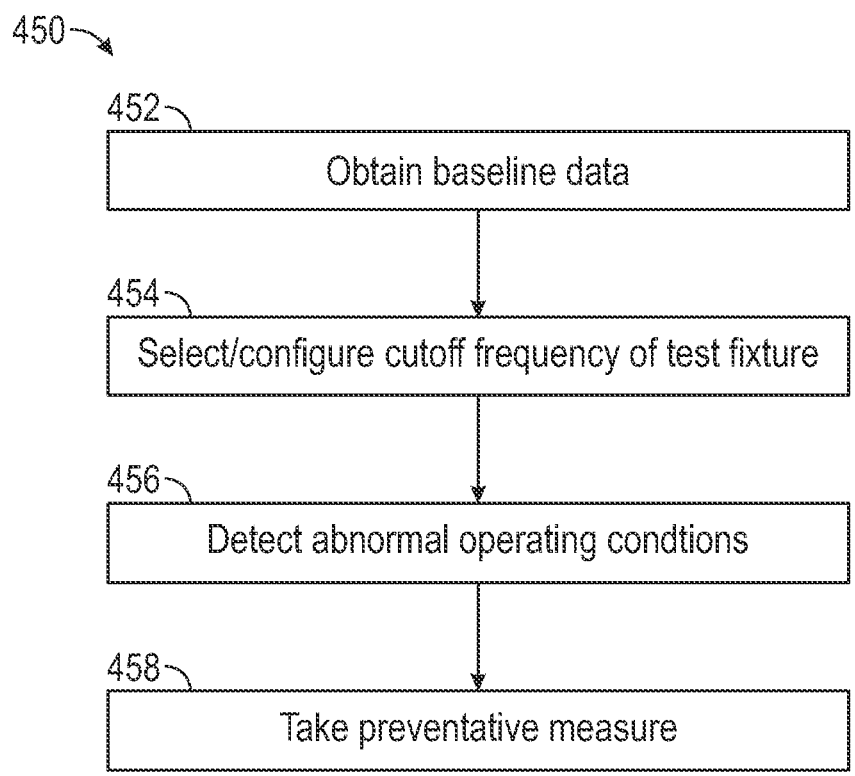
FIG. 4B illustrates a flowchart for monitoring machine health for some embodiments.

FIG. 4B illustrates a method 450 of monitoring the performance of a device in accordance with aspects of the present disclosure. At step 452, baseline data may be obtained. The baseline data for motors 404a, 404b, 404n may be obtained via testing to determine the vibrational characteristics of the motors 404a, 404b, 404n when in use. The baseline data may represent, for example, a range of frequencies that the motors 404a, 404b, 404n operate at during typical operations.

Next, at step 454, test fixtures 406a, 406b, 406n may be selected and/or configured based on a desired cutoff frequency. For example, each fixture 406a, 406b, 406n may be selected to have a cutoff frequency that corresponds to an upper threshold of frequencies that indicates abnormal operating conditions for the motor 404a, 404b, 404n. As previously discussed, the cutoff frequency may be adjustable for each fixture 406a, 406b, 406n by adjusting the length of the slot and/or by adding mass to the fixture.

At step 456, abnormal vibrational data may be detected. Because the fixtures 406a, 406b, 406n may be selected to have a cutoff frequency that corresponds to an upper threshold of the operational frequency of the motor 404a, 404b, 404n, vibrations below this cutoff frequency may be attenuated by the fixture 406a, 406b, 406n. Accordingly, vibrations above the upper threshold and, therefore, above the cutoff frequency, may be measured by the accelerometers in the test fixture 406a, 406b, 406n and communicated to one or more processors 408, indicating abnormal operating conditions for the motor 404a, 404b, 404n. Lastly, at step 458, preventative measures can be taken. The preventative measures can be communicating an alert to a responsible person, adjusting the operation of the motor, disabling the motor entirely, or the like.

It will be appreciated that the motor health monitoring example discussed with respect to FIGS. 4A-4B is just one example use case of test fixtures 100, 200. It is contemplated that test fixtures 100, 200 may have various other applications, such as for audio applications and energy harvesting for MEMS devices. For example, it is contemplated that test fixture 100, 200 could be used to harvest mechanical vibrations above the cutoff frequency, which can be turned to electrical energy. Generally, test fixtures 100, 200 may be used to isolate vibrations below a desired frequency level by configuring the test fixture to have a first mode natural frequency at the desired cutoff frequency.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A vibration testing fixture, comprising:
a fixed end and an unsupported test region configured to receive a unit under test;
a separating slot separating the fixed end from the unsupported test region,
wherein a first mode natural frequency of the test fixture is based on a length of the separating slot;
a mounting slot proximal to the separating slot and extending through the fixed end;
wherein the mounting slot is configured to receive at least one fastener to couple the fixed end to a supporting structure, thereby cantilevering the test fixture.

2. The test fixture of claim 1, wherein the fixed end adjoins a second end, and wherein the separating slot extends along the fixed end and along the second end.

3. The test fixture of claim 1, further comprising at least one peg protruding from a top surface of the unsupported test region and wherein the at least one peg is configured to couple to a mass to adjust a frequency response of the test fixture.

4. The test fixture of claim 1, wherein the length of the separating slot is adjustable to adjust the first mode natural frequency of the test fixture.

5. The test fixture of claim 1, wherein the test fixture is attachable to the supporting structure in a plurality of orientations.

6. The test fixture of claim 1, further comprising: an accelerometer mount for receiving at least one accelerometer, the accelerometer.

7. The test fixture of claim 1, wherein the test fixture comprises at least one of aluminum or magnesium.

8. A vibration testing fixture, comprising:
a slotted edge having an opening therethrough for receiving at least one fastener to fixedly attach the slotted edge to a supporting structure;
a test region; and
a slot proximal to the slotted edge and separating the slotted edge from the test region such that the vibration testing fixture is cantilevered when the slotted edge is coupled to the supporting structure.

9. The test fixture of claim 8, wherein a first mode natural frequency of the test fixture is adjustable based on a length of the slot.

10. The test fixture of claim 9, wherein the first mode natural frequency of the test fixture corresponds to a cutoff frequency of the test fixture.

11. The test fixture of claim 9, further comprising: at least one mounting point configured to receive a coupling mass to increase a mass of the test fixture.

12. The test fixture of claim 8, wherein the test fixture comprises one of aluminum or magnesium.

13. The test fixture of claim 8, where the slot extends along the slotted edge.

14. A vibration testing system, comprising:
a supporting structure; and a test fixture, comprising:
a fixed end having an opening therethrough;
an unsupported test region; and
a slot separating the fixed end from the unsupported test region;
at least one fastener inserted in the opening for fixedly attaching the fixed end to the supporting structure, thereby cantilevering the test fixture.

15. The system of claim 14, wherein the test fixture further comprises:
an accelerometer mount having at least one mounting point for mounting an accelerometer.

16. The system of claim 14, wherein a length of the slot is adjustable.

17. The system of claim 14, further comprising a coupling mass configured to be coupled to the test fixture to increase a mass of the test fixture, thereby adjusting a cutoff frequency of the test fixture.

18. The system of claim 1, wherein the unsupported test region of the test fixture comprises at least one peg configured to receive the coupling mass.

19. The system of claim 14, wherein the test fixture is mountable to the supporting structure in a plurality of orientations.

20. The system of claim 14, further comprising:
a unit under test coupled to the test fixture, wherein the unit under test is configured to be excited such that resultant vibrations are measurable via the test fixture.

* * * * *